R. C. WALL.
WHEEL.
APPLICATION FILED AUG. 16, 1917.

1,274,472.

Patented Aug. 6, 1918.

WITNESSES
Frederick W. Ely

INVENTOR
Robert C. Wall
BY
ATTORNEY

UNITED STATES PATENT OFFICE.

ROBERT C. WALL, OF PHILADELPHIA, PENNSYLVANIA.

WHEEL.

1,274,472.

Specification of Letters Patent. Patented Aug. 6, 1918.

Application filed August 16, 1917. Serial No. 186,440.

*To all whom it may concern:*

Be it known that I, ROBERT C. WALL, a citizen of the United States, and resident of Philadelphia, county of Philadelphia, and State of Pennsylvania, have invented an Improvement in Wheels, of which the following is a specification.

The object of my invention is to provide certain improvements in spokes and wheels formed thereof which shall embody simplicity and accuracy of manufacture, together with strength and durability.

My invention has for a further object, the making of the spoke members in such form that a plurality of such spokes may be interlocked to form a continuous self-sustaining hub portion, the assembling being easy of accomplishment and inexpensive.

With these and other objects specified hereinafter, my invention consists in the construction of the spoke and combination of a plurality of said spokes to constitute a wheel structure, as more fully described in connection with the accompanying drawings and pointed out in the claims.

Figure 1:
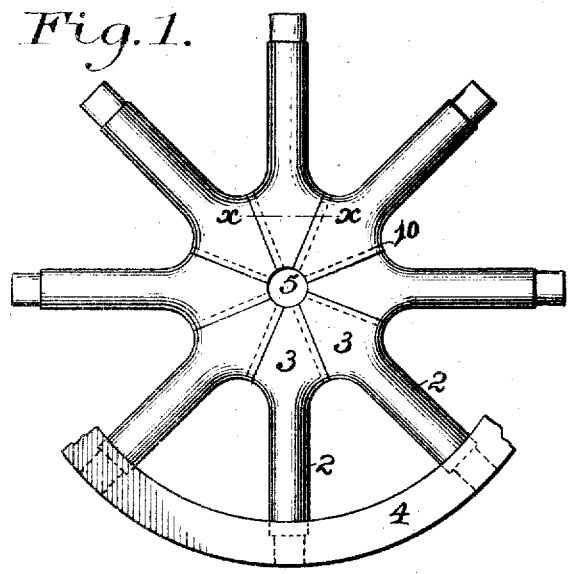
Figure 2:
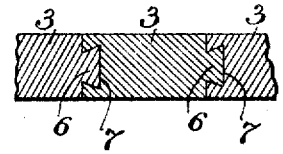
Figure 3:
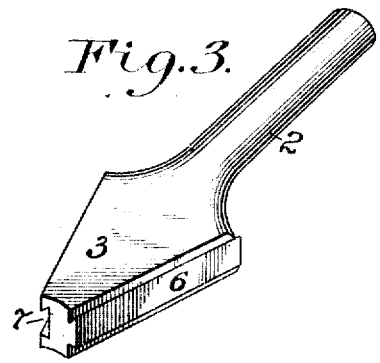
Figure 4:
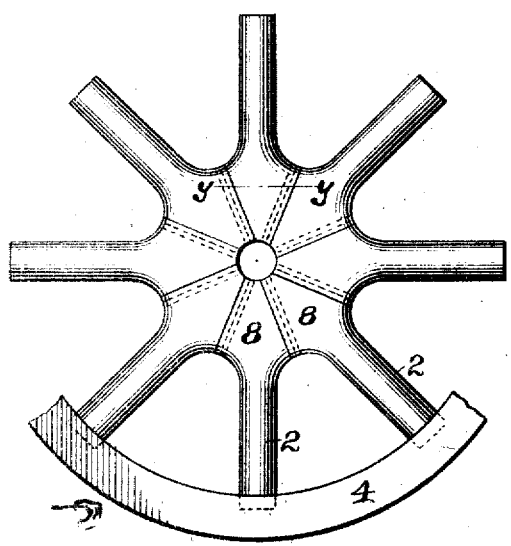
Figure 5:
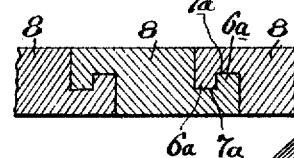

Referring to the drawings, Figure 1 is a side elevation of a wheel embodying my invention with a portion of the felly removed; Fig. 2 is a cross section of a portion of the same taken on line x—x of Fig. 1; Fig. 3 is a perspective view of one of my improved spokes; Fig. 4 is a side elevation similar to Fig. 1 but with a slightly different construction of spokes; Fig. 5 is a cross section of the same on line y—y of Fig. 4; and Fig. 6 is a perspective view of the spokes employed in the wheel of Figs. 4 and 5.

Referring to Figs. 1, 2 and 3, the spokes 2 are each provided with a V-shaped hub section 3 having one of its inclined edges provided with a dove-tail rib 6 and the other inclined edge with a corresponding dove-tail groove 7 (Fig. 3); and when these hub sections of adjacent spokes are interlocked as shown in Figs. 1 and 2, they are not only held in a circular arrangement, but are also locked against lateral displacement. When the spokes are thus interlocked, they are also glued in position one upon the other so as to provide an integral hub to the wheel with a central aperture 5. In practice, the wooden wheel thus formed is fitted with a suitable felly 4 of wood or metal to suit the particular use for which the wheel is intended; and is further provided with the usual metal roller or ball bearing hub (not shown) which fits through the hole 5 and is clamped upon opposite faces of the spoke parts 3, bracing them as is customary.

It will be understood, that as the rib 6 and groove 7 of the hub section 3 of the spoke are at an angle to each other, it would not be possible to assemble the spokes into a full circle or wheel as shown in Fig. 1, and hence to insure the proper assembling the spokes are first joined to form two semi-circular wheel parts, each composed of an equal number of spokes (four in the example shown), and these may be interlocked by a sliding movement of one part upon the other in alinement with the ribs and grooves to be engaged. The ribs and grooves are made quite shallow so as not to consume needless lumber, and also to avoid weakness which would result from too deep a groove. By reason of this shallowness of the tongue or rib 6 and groove 7, the semi-circular parts may be assembled without excessive binding, but all binding may be obviated by providing one of the end spoke hub sections 3 of one semi-circular part with two grooves 7 and the adjacent end spoke section of the other semi-circular part with two ribs or tongues 6, as at 10 in Fig. 1. In this way the ribs 6 on opposite sides of the hole part 5 will be in alinement as will also be the grooves, and hence it will be as if a single groove and a single rib extended entirely across the hub sections. After the wheel is glued and associated with the felly and metal hub and axle bearing portions to provide the ball or roller bearings, there is no further possibility for the spokes to shift longitudinally.

Figure 6:
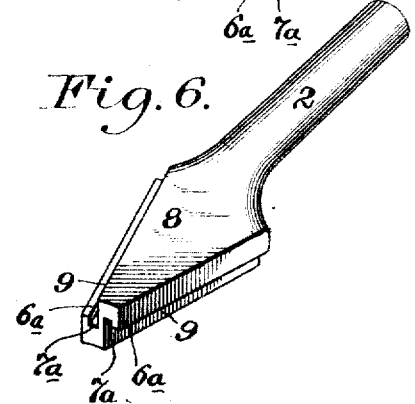

In the construction shown in Figs. 4, 5 and 6, I have employed the same general features as above described, except in respect to the form of the ribs and grooves and these, as in the other example, interlock to hold the spokes together with a self-contained hub portion. From Figs. 5 and 6, it will be seen that the edges of the V-shaped hub section 8 of the spokes are grooved as at 7ᵃ to provide tongues or ribs 6ᵃ and walls 9 continuous with one of the walls of the grooves. These spokes have the grooves and tongues or ribs directed laterally instead of in the plane of the wheel; and each of the edges 9 of the V section 8 have both a rib 6ª and a groove 7ª, but said parts at the two edges are oppositely directed as will be seen from Figs. 5 and 6. These spokes may be assembled as in the first described example, in which the two semicircular parts of the wheel are first formed and then united by sliding them together along one diameter; or instead, the spokes may be assembled by interengaging them from the side throughout the entire circle, though in the engaging of the last section 8 the same will have to be sprung in at both sides (Fig. 5). The grooves 7ª and the ribs 6ª are made quite shallow so as not to weaken the spoke. These spokes are also glued together when being assembled, so that the wheel is self-sustaining when completed and the glue is dry.

Wheels of this class are especially adapted for automobiles and the radial length of the spokes may be cut to suit the diameter of the wheel required; the particular application of the felly and tire is separate from my invention, which relates solely to the construction of the wooden spokes and their assemblage into a circular wheel ready for the felly and metal axle hub and bearing.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A wheel structure consisting of a plurality of spoke members each having a V-shaped hub section and which when assembled provide a continuous hub with radiating spokes, the opposite edges of all of the hub sections except two respectively provided with a rib and a groove and of the remaining two hub sections one of which is provided on both its edges with ribs and the other provided on both its edges with grooves, said ribs and grooves of all of the hub sections arranged radially and interlocking in pairs to unite the adjacent hub sections to prevent the spoke members separating radially and circumferentially, said ribs formed on the edges of the hub sections to constitute a permanent part thereof.

2. A wheel structure consisting of a plurality of spoke members each having a V-shaped hub section and which when assembled provide a continuous hub with radiating spokes, the abutting edges of the hub sections united by interlocking ribs and grooves integrally formed with said hub sections, said ribs and grooves arranged radially of the hub and said interlocking hub sections having their interlocking ribbed and grooved edges made of complementary forms, whereby a rib of one section will interlock with a groove of the next adjacent section to prevent said spokes separating radially and circumferentially.

In testimony of which invention, I hereunto set my hand.

ROBERT C. WALL.

Witnesses:
 R. M. HUNTER,
 FLORENCE DEACON.